United States Patent [19]

Nepela et al.

[11] Patent Number: 5,473,486
[45] Date of Patent: Dec. 5, 1995

[54] AIR BEARING THIN FILM MAGNETIC HEAD WITH A WEAR-RESISTANT END CAP HAVING ALTERNATING LAMINATIONS

[75] Inventors: Daniel A. Nepela, San Jose; Paul H. Schmidt, Fremont, both of Calif.

[73] Assignee: Read-Rite Corp., Milpitas, Calif.

[21] Appl. No.: 384,467

[22] Filed: Feb. 2, 1995

Related U.S. Application Data

[63] Continuation of Ser. No. 123,680, Sep. 20, 1993, abandoned.

[51] Int. Cl.[6] .......................... G11B 21/21; G11B 17/32
[52] U.S. Cl. ............................................. 360/103; 360/126
[58] Field of Search ...................................... 360/103, 126, 360/102

[56] References Cited

U.S. PATENT DOCUMENTS

| | | | |
|---|---|---|---|
| 4,219,853 | 8/1980 | Albert et al. | 360/103 |
| 5,184,393 | 2/1993 | Saito et al. | 360/122 |
| 5,237,476 | 8/1993 | Bischoff et al. | 360/126 |
| 5,301,077 | 4/1994 | Yamaguchi et al. | 360/103 |

Primary Examiner—John H. Wolff
Assistant Examiner—George J. Letscher
Attorney, Agent, or Firm—Nathan N. Kallman

[57] ABSTRACT

A wear-resistant end cap is provided for an air bearing slider of a thin film magnetic recording head useful in a disk drive. The slider has an air bearing surface that is positioned adjacent to a rotating surface of a magnetic disk during data recording or readout. A thin film transducer is deposited on the trailing end of the slider perpendicular to the air bearing surface. A laminated end cap is deposited on the trailing end surface disposed normal to the disk recording surface to protect the transducer. The end cap includes a first lamination disposed with an edge in a plane parallel to the air bearing surface of the slider and a second contiguous lamination of a different material having an edge in the plane whereby the edge areas of the contiguous laminations have relatively more wear resistance than the wear resistance of an equivalent edge area of either material taken alone.

9 Claims, 3 Drawing Sheets

AIR BEARING THIN FILM MAGNETIC HEAD WITH A WEAR-RESISTANT END CAP HAVING ALTERNATING LAMINATIONS

This application is a continuation of application Ser. No. 08/123,680, filed Sep. 20, 1993, now abandoned.

FIELD OF INVENTION

This invention relates to air bearing thin film magnetic heads and in particular to a wear-resistant end cap for such magnetic heads.

DESCRIPTION OF PRIOR ART

Air bearing thin film magnetic recording heads are used extensively in disk drives that store information. An air bearing thin film magnetic recording head typically comprises an air bearing slider and a magnetic transducer that is deposited on an end of the slider. The transducer is formed with a magnetic yoke having spaced first and second pole piece layers that define a transducing gap and an electrically conductive coil structure between the magnetic layers. A disk drive generally comprises one or more magnetic disks on which data is stored. During operation of the disk drive, an air bearing thin film magnetic head associated with a disk surface is positioned to selected ones of a plurality of concentric recording tracks on the disk surface so that data may be transferred to and from the track as the magnetic disk rotates. The data track density and bits per inch along the track are directly related to how close the thin film magnetic transducer which is at the air bearing surface of the slider can be made to fly over the disk surface. The art suggests various air bearing slider configurations to optimize the various trade-offs between flying height and wear. Some wear occurs on the magnetic head and on the magnetic disk surface at very low flying heights, since the disk, when inspected microscopically, has a surface topography with peaks and valleys which can cause contact of the trailing edge of the slider and the disk surface.

The end surface of the head slider is normal to the recording surface of the disk when the slider is positioned adjacent to the disk. An end cap is deposited over the thin film transducer structure to protect the transducer from physical damage during the manufacturing process. The slider member is made either from aluminum oxide/titanium carbide or silicon carbide, by way of example. The multilayered transducer deposited on the slider member includes a base layer of insulation material, such as alumina, a P1 layer formed from a magnetic material, such as Permalloy, a nickle-iron alloy, a winding layer of insulated copper turns, a P2 layer of the same magnetic material of Permalloy and an end cap. The end cap typically comprises a material such as sputter deposited alumina, which after being deposited does not cause any undue stress in the layers of the transducer member. It has been found that some materials which would appear to have the appropriate protective characteristics cannot be used because they induce various stresses in the layers of the transducer which adversely affect the operation of the device.

One of the last steps in the manufacturing process of thin film heads is the lapping of the air bearing surface in order to expose the transducing gap that is formed between the P1 and P2 layers. Since the bottom of the P1 and P2 pole tips are in a plane nearly parallel to the air bearing surface of the head slider, lapping of the surface has become the accepted method of controlling the throat height of the thin film transducer. The nature of the lapping process tends to undercut the transducer and the end cap in the area exposed to the lapping surface. It would therefore be an advantage to have an end cap made of material that is wear-resistant and does not induce significant stress into the transducer structure.

It has also been recognized that because of the flying characteristics of air bearing transducers, there is a tendency for the air bearing surface to fly at an angle relative to the disk surface at essentially all disk velocities wherein the slider is flying although at different trailing edge heights. Thus during starting and stopping phases of disk file, the trailing edge of the air bearing transducer is considerably closer to the disk surface than is the leading edge. As a result, the end cap is subjected to considerably more wear than any other part of the transducer. Significant wear can adversely affect the transducing characteristics of the transducer per se. The wear is also significant from the standpoint that debris is being generated that can affect the required air purity characteristics of the internal head-disk assembly environment and can result in catastrophic head crashes. The provision of a substantially wear-resistant end cap would avoid some of the critical problems associated with present day air bearing magnetic recording transducers. The present invention provides an end cap structure for a magnetic transducer that results in increased wear resistance without inducing adverse stresses in the magnetic transducer structure.

SUMMARY OF INVENTION

An object of this invention is to provide a wear-resistant end cap for an air bearing magnetic recording device.

Another object of the present invention is to provide an end cap for an air bearing magnetic head which is more resistant to wear without adversely affecting the transducing characteristics of the head.

In accordance with the present invention, an air bearing thin film magnetic transducer is provided with a laminated end cap comprising at least two contiguous thin film laminations, each lamination being of a different material, and disposed in a plane normal to the air bearing surface of the transducer device. In the preferred embodiment, the end cap has a thickness in the range of about 0.5–2.0 mils (milli-inches) and each lamination has a thickness in the range of 10–1000 Angstroms, where 1 mil is equal to 25.4 micrometers and 1 micrometer is equal to 10,000 Angstroms. The contiguous layers need not be of equal thickness but the thickness of each will depend on the stress balancing characteristics of the respective materials and the economics of depositing each layer of the materials.

BRIEF DESCRIPTION OF THE DRAWING

The invention will be described in greater detail with reference to the drawing in which.

DESCRIPTION OF THE PREFERRED EMBODIMENT

Figure 1:
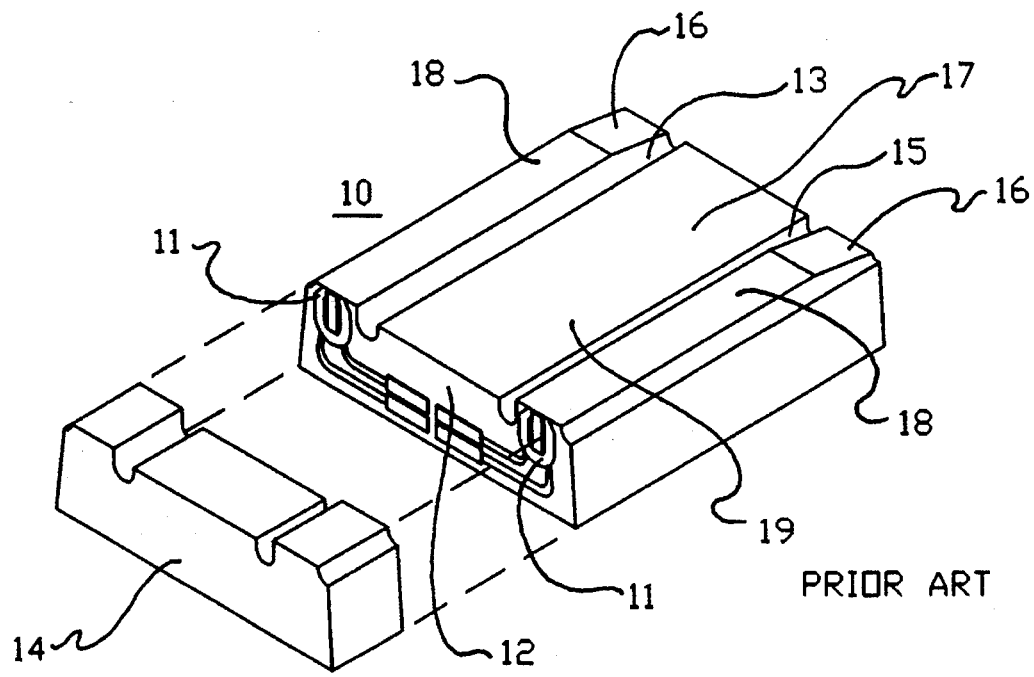
FIG. 1 is a perspective view, partially exploded, of a typical prior art air bearing magnetic head slider.
Figure 2:
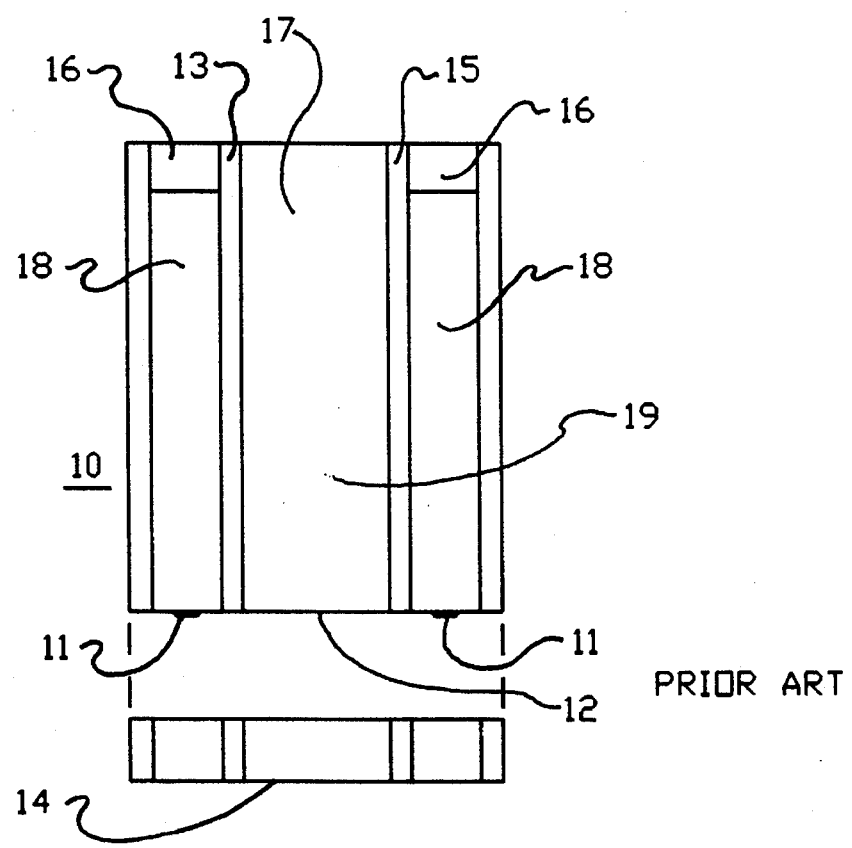
FIG. 2 is a plan view, partially exploded, of the magnetic head slider shown in FIG. 1 illustrating a typical tri-rail configuration of the air bearing surface.

With reference to FIGS. 1 and 2, a typical prior art air bearing slider used with magnetic head assemblies comprises a slider member 10 having thin film type magnetic transducers 11 which are deposited on the trailing end surface 12 of slider member 10, and a thick solid end cap, made of sputtered alumina, for example, which is disposed over the slider trailing end to protect the transducers during subsequent steps of the manufacturing process. The opposite end 17 of the slider member 10 is defined as the leading end of the slider. Tapers 16 are formed at the leading edge of the slider 10. The slider is fabricated with side rails 18 having adjacent grooves 13 and 15 encompassing a central recessed region 19.

During the start mode of the disk drive and during subsequent data processing, leading end 17 of the slider 10 is generally spaced further from the disk surface than the trailing edge which includes the end cap 14. When the drive is turned off and the disk rotational speed is reduced, the trailing edge of the slider experiences a longer period of contact with the disk surface than the points forward of the trailing end of the slider. As a result, the end cap tends to experience more contact with the disk and hence more wear than other parts of the slider.

During manufacture of the air bearing sliders, the thin film transducers 11 are deposited and then processed to provide proper throat height of the transducing gap. To accomplish this process, it is common practice to lap the air bearing surface of the slider until the pole tips are formed to predetermined dimensions for reading and writing data. It is this process that causes the undercutting of the end cap 14. The typical prior art end cap material, i.e., sputtered alumina, is not as hard as the head slider material and thus tends to wear faster during the lapping process.

Figure 3:
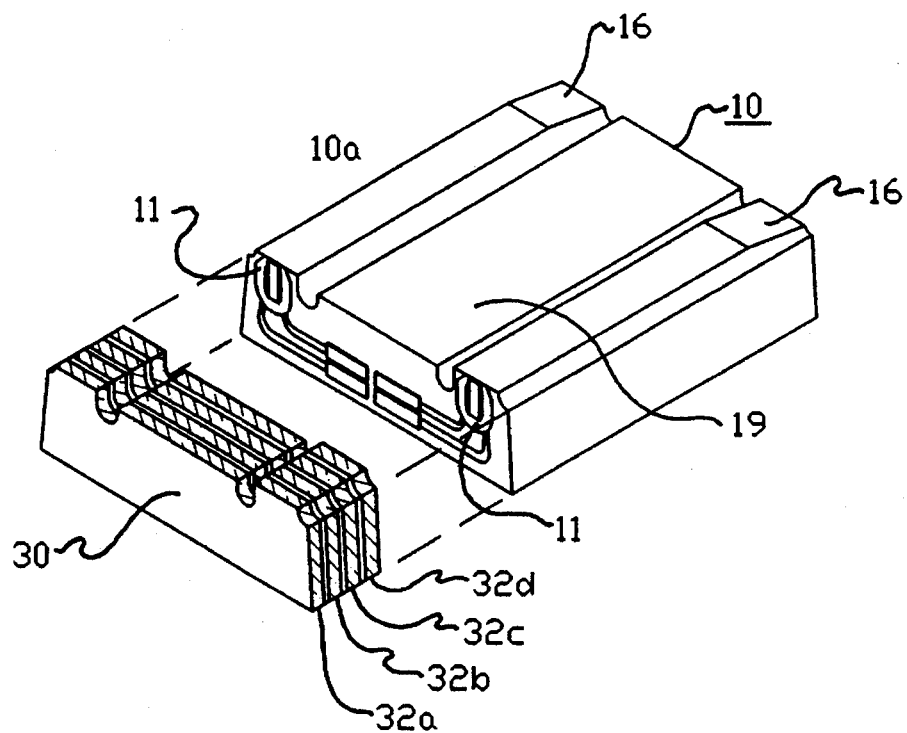
FIG. 3 is a perspective view, partially exploded, illustrating the layered construction of the end cap, as implemented with this invention.

In an embodiment of this invention, an end cap 30 is formed as a laminated structure, as shown in FIG. 3. The laminated structure 30 comprises a plurality of layers 32a–32d of different materials deposited alternately in parallel planes which are disposed on the slider 10A so that the planes are normal to the recording surface. The end cap layers 32a–32d are preferably coextensive with the trailing end surface of the slider 10A. The increase in wear resistance is derived at the edge area of the laminated structure 30 on a silicon carbide body, for example, that comes in contact with the surface of the magnetic disk during recording. The laminated structure 30 may consist of alternating laminations of nitrides and carbides, for example, TaN and TaC ranging from 200–2000 Angstroms thickness of each member of the pair. The slider body may be made of silicon carbide or alternatively made of aluminum oxide/titanium carbide. For a slider body made of aluminum oxide and titanium carbide, an alternating pair of compounds, such as ZrC and TiN, having thicknesses ranging from 200–2000 Angstroms can be used. It is known that carbides and nitrides possess very good adhesion to one another. Therefore, intervening metallic layers generally are not required. In another embodiment, specified metals taken from the list of Table I included herein can be interposed between the nitride and carbide elements at a thickness of 10–100 Angstroms for particular slider bodies.

When an intervening metal is used to achieve adhesion, any arbitrary pair of two compounds listed in Table I can be used for a specific slider body, when any element having a thickness of 10–100 Angstroms is interposed in the slider body between compounds arbitrarily selected from the appropriate column of Table I.

The total number of lamination pairs is equal to the total desired thickness of the end cap 30 divided by the thickness of a repeating pair or triad. The objective is to have an intrinsic stress (compressive or tensile) in the range of $1–5\times10^8$ dyne/cm$^2$, i.e., low stress. The intrinsic stress of any particular material, compound or alloy, depends on the number and kind of defects, such as interstitials or vacancies, present in the deposited film. A further objective of this invention is to balance the alternating layers so that $\delta_1 t_1 \approx \delta_2 t_2$, where $\delta_1$ and $\delta_2$ are of opposite sign, such that tensile or compressive stress or any resulting mismatch of the $\delta t$ products should not result in total stress, that is the intrinsic residual stress within $\pm 1–5\times10^8$ dyne/cm$^2$ per pair. The subscripts 1 and 2 refer to individual members of a pair.

Combinations of substrate bias, substrate temperature, deposition rate and gas pressures can be used to produce equal and opposite intrinsic stresses in each member of a pair or triad of layers which subsequently repeat to form the total thickness of the end cap.

The concept of successfully laminating different materials over or on top of the thin film magnetic transducers involves a choice of materials having known controllable stress such that stress compensation for the pair occurs. By a selection of materials with opposite intrinsic stress characteristics or low intrinsic stress, i.e., less than or equal to $5\times10^8$ dynes/cm$^2$, it is possible to minimize any adverse affects on the transducer device that might result from the total stress from the protective end cap 30. In addition, since it is possible to position the edge area of the laminated structure perpendicular to the recording surface, and since this composite laminated area is stronger and harder than the same area of either lamination material, the resulting end cap structure has considerably more wear resistance than that obtainable by prior art structures.

Figure 4A:
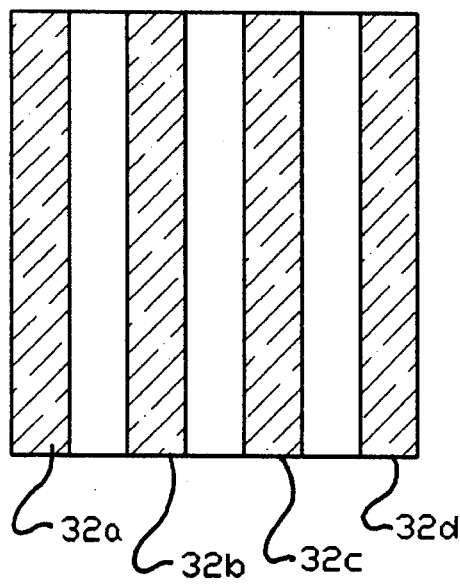
FIGS. 4A and 4B are enlarged cross-sectional views illustrating the laminated end cap used with the air bearing slider, in accordance with this invention.
Figure 4B:
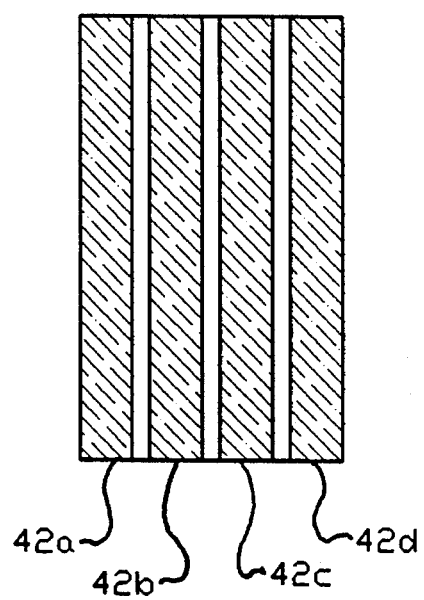

In the preferred embodiment, the total thickness of the end cap normal to the laminations is in the range of 0.5 mils to 2 mils or approximately 12 micrometers to 50 micrometers. The thickness of each lamination is in the range of 10–5000 Angstroms, as in FIG. 4A. Contiguous laminations do not have to be of the same thickness and are controlled to be within $\pm 1–5\times10^8$ dyne/cm$^2$ per pair of laminations. The preferred slider materials are a composite of aluminum oxide-titanium carbide, approximately 40–75% by volume of the alumina, having a thermal coefficient of expansion $\alpha$ of $7.9\times10^{-6}$/°C. and silicon carbide, with $\alpha=4.4\times10^{-6}$/°C.

When fabricating end cap materials, it is desirable that the end cap material have an thermal expansion coefficient of about $\pm 1.5\times 10^{-6}$/°C. relative to the slider body. Table I on page 10 provides a representation of materials fitting this criterion for the two preferred slider bodies of silicon carbide and aluminum oxide/titanium carbide. The purpose of the $\alpha$ of laminations being within $\pm 1.5\times10^{-6}$/°C. of the slider body is to limit the thermal mismatch stress to approximately $\pm 6\times10^8$ dyne/cm$^2$, reflecting the need for processing thin film magnetic recording heads at about 200° C. above ambient temperature for photoresist curing. In this way the stress differential between the laminated end cap and the slider body is minimized.

Attached Table I lists the different materials, including elements and compounds, which provide a matching alpha of the slider body material. With reference to Table I, any pseudo-matching alpha materials relative to the end cap alpha may be used in any alternating and repeating sequence so that any arbitrary pairs or triads of elements or compounds under either the SiC or alumina-titanium carbide columns may be matched to their respective slider bodies. The choice of repeating pairs or triads is arbitrary since comparable results will be achieved by essentially any pairs or triads within a column.

Alternatively any arbitrary pairing of compounds may be attained by inserting a layer within the column between the components chosen so that the thickness of the compounds is approximately in the range of 5–10:1 relative to the element. For example, each compound member chosen from the column is separated by about 10– 200 Angstroms of a pure element found in the appropriate slider body column.

A reasonable match of the thermal expansion coefficient of the end cap compound and the slider body is required so that thermal mismatch stress is no greater than about $5 \times 10^8$ dyne/cm$^2$. Thus for a slider body made of silicon carbide, it is necessary to have an end cap material with an expansion coefficient mismatch less than $1.5 \times 10^{-6}$, i.e., the end cap material has an expansion coefficient $\leq 5.9 \times 10^{-6} \geq 2.9 \times 10^{-6}$ and may be a composition of any single member shown in Table I for the entire end cap or any repeating pair or triad. The SiC slider body is preferred when it is associated with an appropriate end cap designed to protect the magnetic transducer from the effects of exposure to the environment and to the manufacturing process, and also to protect the transducer during mechanical cutting operations necessary to form the finished slider body including the end cap and the magnetic transducers. In an embodiment of this invention, the end cap structure comprises a slider body made of a monolithic layer of silicon carbide, which may be used with a silicon carbide slider body or other compatible slider material.

By this method, wear rate will be minimized by virtue of an increasing hardness associated with the laminate structure which occurs largely by the increased yield strength associated with the laminate structure. Hardness is approximately equal to three times the material yield strength. As a result, a decreased wear rate of the end of the slider body usually associated with a reduced coefficient of friction will be obtained. Thus, the novel approach disclosed herein produces a more reliable and crash-resistant slider body/disk interface.

By virtue of this invention, the durability of the head-to-disk interface is significantly improved in disk drives using contact start-stop, pseudo-contact or contact recording. The wear resistance of a laminated structure using materials specified above is greater than a conventional integral structure using a single material.

Figure 5:
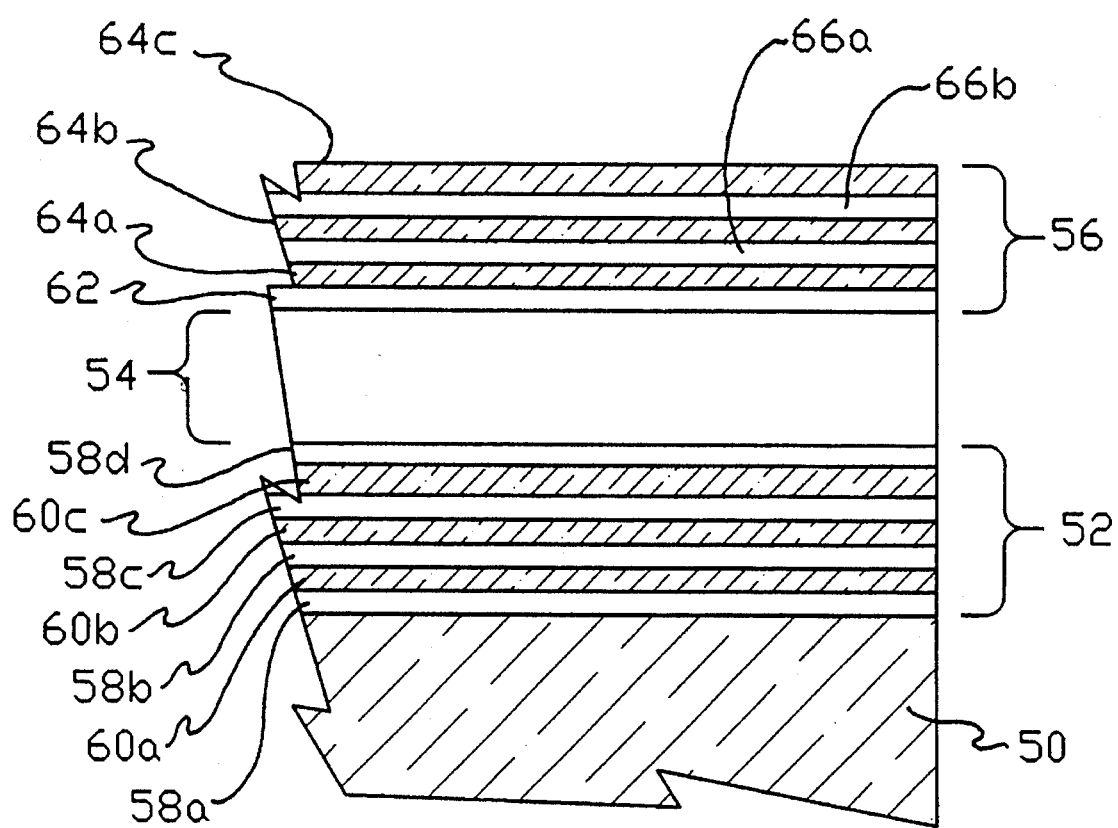
FIG. 5 is a cross-sectional view, partly broken away, showing a magnetic tape head using laminated end caps, in accordance with this invention.

The invention is also applicable to magnetic tape heads using magnetoresistive (MR) sensors or inductive heads, or a combination of both. As shown in FIG. 5, a magnetic head assembly includes a substrate 50 on which a laminated multilayer structure 52 is formed. The end cap structure 52 includes insulating layers 58a–58d which separate layers 60a–60c and the substrate 50 and read/write transducer 54 including MR element 55. A second laminated end cap structure 56 is formed above the read/write transducer 54 and an insulating layer 62 is disposed there between. The laminated structure 56 includes end cap layers 64a–64c with interleaved insulating layers 66a and 66b. Both structures 52 and 56 are formed with end cap materials selected from Table I. The tape head assembly may be encapsulated to provide maximum wear resistance.

TABLE I

Elements and compounds possessing a thermal expansion coefficient within $\pm 1.5 \times 10^{-6}$ $\Delta l/l/°C$. of the $\Delta l/l/°C$. of the indicated slider body.

| Slider Body is SiC and $\Delta l/l/°C. = 4.4 \times 10^{-6}$ | | Slider Body is Al$_2$O$_3$/TiC and $\Delta l/l/°C. = 7.9 \times 10^{-6}$ | |
|---|---|---|---|
| Compound or element | $\Delta l/l/°C$. | Compound or element | $\Delta l/l/°C$. |
| TaC | $5.5 \times 10^{-6}$ | CrB | $9.4 \times 10^{-6}$ |
| CrB2 | $5.7 \times 10^{-6}$ | Mo$_2$C | $8 \times 10^{-6}$ |
| WC | $5 \times 10^{-6}$ | CeO$_2$ | $8.9 \times 10^{-6}$ |
| HfB$_2$ | $5.7 \times 10^{-6}$ | ZrO$_2$ | $7.6 \times 10^{-6}$ |
| TiB$_2$ | $5.5 \times 10^{-6}$ | HfC | $6.6 \times 10^{-6}$ |
| VB$_2$ | $5.3 \times 10^{-6}$ | ZrC | $9.1 \times 10^{-6}$ |
| W$_2$C | $5.8 \times 10^{-6}$ | TiN | $9.3 \times 10^{-6}$ |
| TaN | $5.2 \times 10^{-6}$ | Al$_2$O$_3$ | $8.8 \times 10^{-6}$ |
| Nb$_5$Si$_3$ | $4.6 \times 10^{-6}$ | TiB$_2$ | $9 \times 10^{-6}$ |
| Mo | $5 \times 10^{-6}$ | BN | $7.5 \times 10^{-6}$ |
| W | $4.5 \times 10^{-6}$ | V$_3$N | $8.1 \times 10^{-6}$ |
| Zr | $5.9 \times 10^{-6}$ | MoSi$_2$ | $8.3 \times 10^{-6}$ |
| Cr | $5.6 \times 10^{-6}$ | TaSi$_2$ | $8.9 \times 10^{-6}$ |
| Si | $4.2 \times 10^{-6}$ | WSi$_2$ | $8.6 \times 10^{-6}$ |
| Hf | $6.2 \times 10^{-6}$ | Ta | $6.8 \times 10^{-6}$ |
| HfO$_2$ | $5.8 \times 10^{-6}$ | Ge | $6.7 \times 10^{-6}$ |
| | | Nb | $8.5 \times 10^{-6}$ |
| | | Ti | $10 \times 10^{-6}$ |

What is claimed is:

1. An air bearing thin film magnetic head for use in a disk drive comprising:

a substrate having an air bearing surface and a trailing end surface disposed normal to said air bearing surface;

a magnetic recording transducer deposited on said trailing end surface;

an end cap deposited over said trailing end surface and said transducer for providing wear resistance and for protecting said transducer from damage and wear, the structure of said end cap being formed with a plurality of alternating laminations of different materials, wherein said laminations are formed of materials having substantially closely matched thermal coefficients of expansion, wherein one of said different materials is carbide, and including a continuous lamination of a nitride wherein the total thickness of said alternating carbides and nitrides is 0.5–2.0 milli-inches.

2. A magnetic head as in claim 1, wherein a silicon layer having a thickness of 50–100 Angstroms is disposed between each pair of carbide and nitride materials to provide a total thickness of 0.5–2.0 milli-inches.

3. A magnetic head as in claim 1, wherein said laminations are made of pure elements and compounds.

4. A magnetic head as in claim 1, wherein said laminations are coextensive with said trailing end surface.

5. An air bearing thin film magnetic head for use in a disk drive comprising:

a substrate having an air bearing surface and a trailing end surface disposed normal to said air bearing surface;

a magnetic recording transducer deposited on said trailing end surface, said transducer including first and second magnetic pole piece layers forming a magnetic yoke, each of said pole piece layers being formed of a nickel-iron alloy or Permalloy; and an end cap deposited over said trailing end surface and said transducer for providing wear resistance and for protecting said transducer from damage and wear, the structure of said end cap being formed with a stack of alternating laminations of different materials, wherein said laminations are formed of materials other than nickel-iron or Permalloy, said lamination materials having substantially closely matched thermal coefficients of expansion.

6. A magnetic head as in claim 5, wherein the dimension of said end cap in a direction normal to said parallel planes of said laminations is in the range of 0.5–2.0 milli-inches.

7. A magnetic head as in claim 5, wherein each of said laminations has a thickness in the range of 10–5000 Angstroms.

8. A magnetic head as in claim 5, in which one of said different materials is a carbide.

9. A magnetic tape head assembly comprising:
a nonmagnetic substrate;
a first end cap deposited over said substrate for providing wear resistance;
a read/write transducer formed over said first end cap, said transducer including first and second magnetic pole piece layers forming a magnetic yoke, each of said pole piece layers being formed of a nickel-iron alloy or Permalloy;
a second end cap deposited over said read/write transducer, said first and second end caps being formed as laminated structures with alternating laminations of different materials including layers of wear resistant materials, said first and second end caps being formed without nickel-iron or Permalloy.

* * * * *